Dec. 27, 1932.  L. S. BURBANK  1,892,445
MACHINE FOR PRODUCING BOLTS, SCREWS, AND THE LIKE
Filed June 7, 1928  10 Sheets-Sheet 1
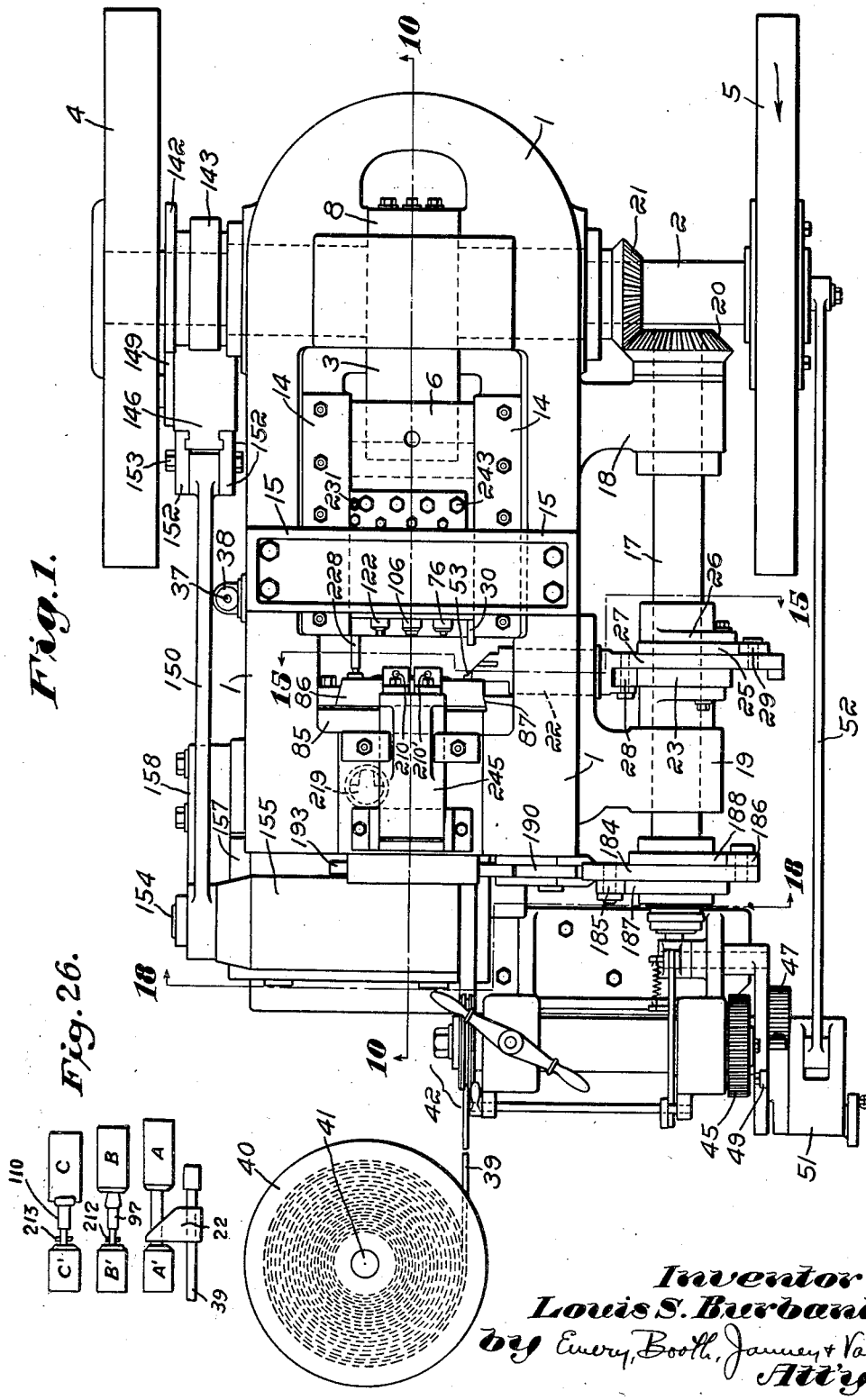
Inventor:
Louis S. Burbank,
by Emery, Booth, Janney & Varney
Att'ys.

Dec. 27, 1932.  L. S. BURBANK  1,892,445
MACHINE FOR PRODUCING BOLTS, SCREWS, AND THE LIKE
Filed June 7, 1928    10 Sheets-Sheet 2
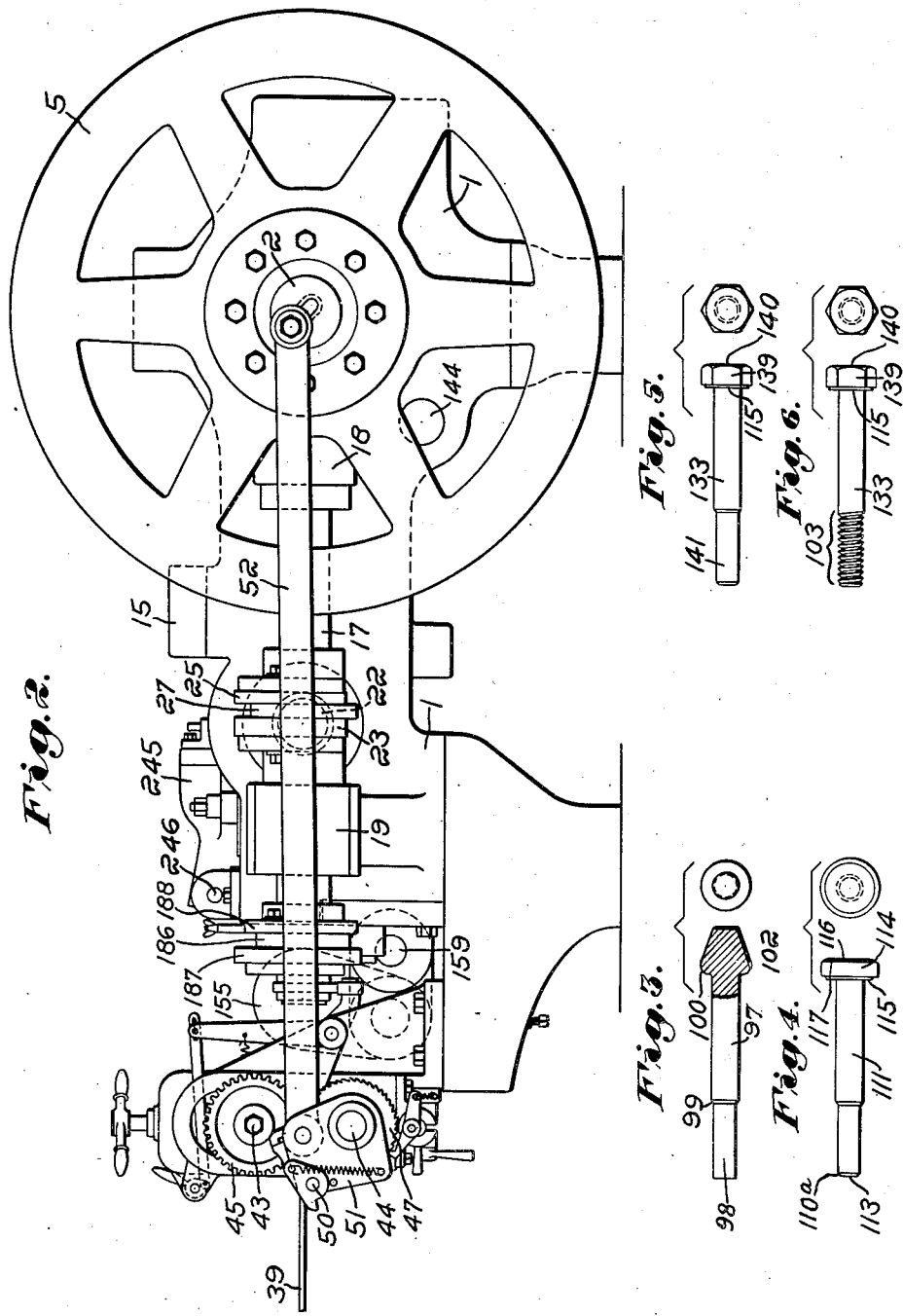
Inventor:
Louis S. Burbank,
by Emery, Booth, Janney & Varney
Att'ys.

Dec. 27, 1932. L. S. BURBANK 1,892,445
MACHINE FOR PRODUCING BOLTS, SCREWS, AND THE LIKE
Filed June 7, 1928 10 Sheets-Sheet 3

Inventor:
Louis S. Burbank,
by Emery, Booth, Janney & Varney
Attys.

Dec. 27, 1932.   L. S. BURBANK   1,892,445
MACHINE FOR PRODUCING BOLTS, SCREWS, AND THE LIKE
Filed June 7, 1928   10 Sheets-Sheet 4
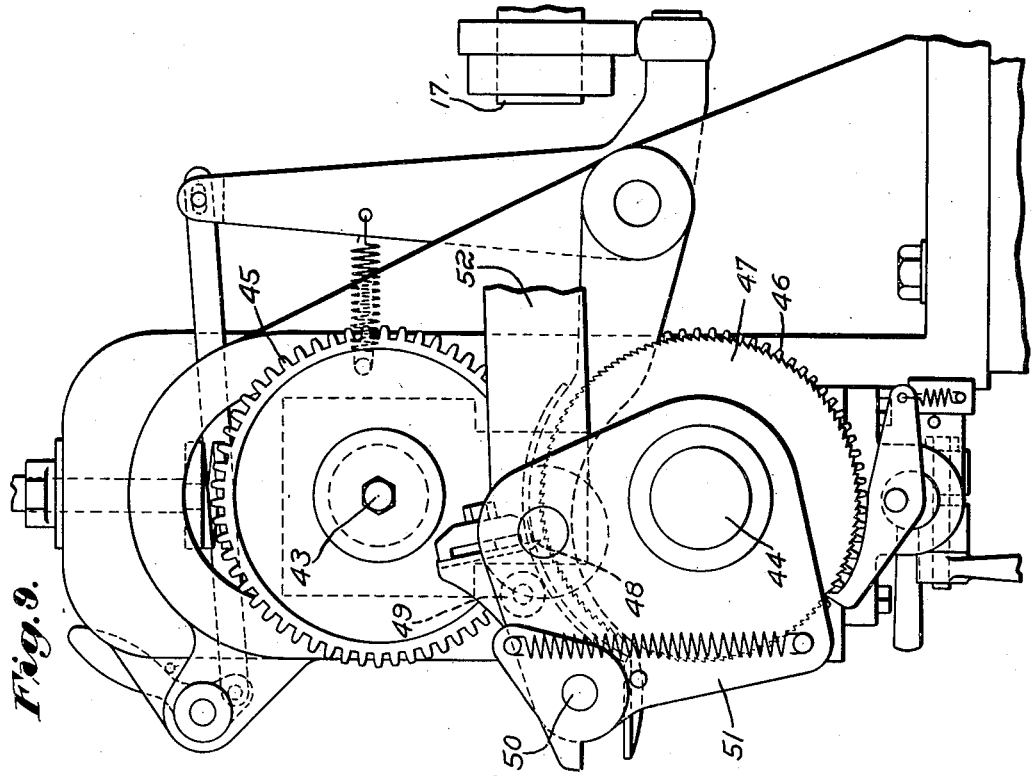
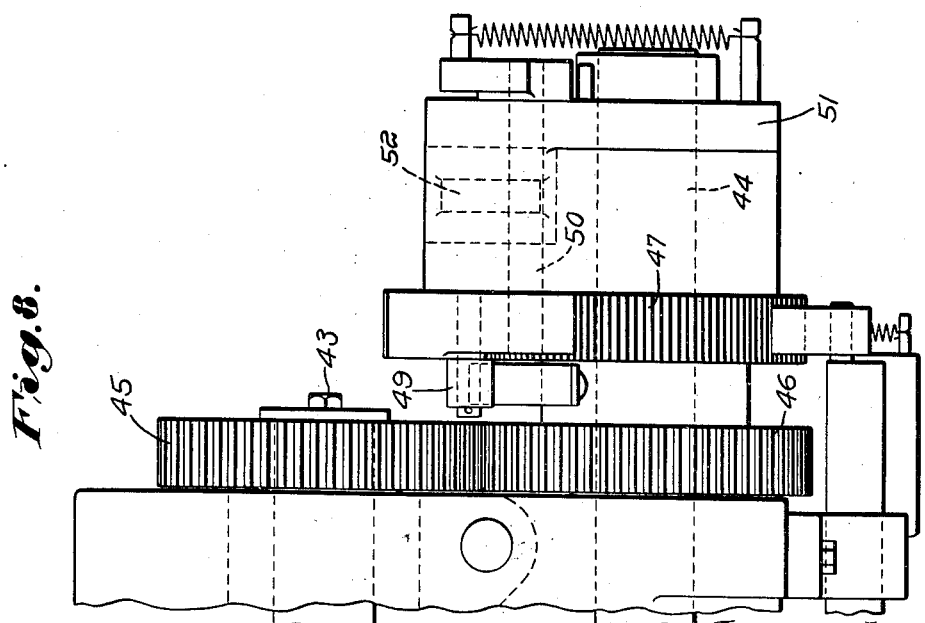
Inventor:
Louis S. Burbank,
by Emery, Booth, Janney & Varney
Att'ys.

Dec. 27, 1932.     L. S. BURBANK     1,892,445
MACHINE FOR PRODUCING BOLTS, SCREWS, AND THE LIKE
Filed June 7, 1928     10 Sheets-Sheet 5
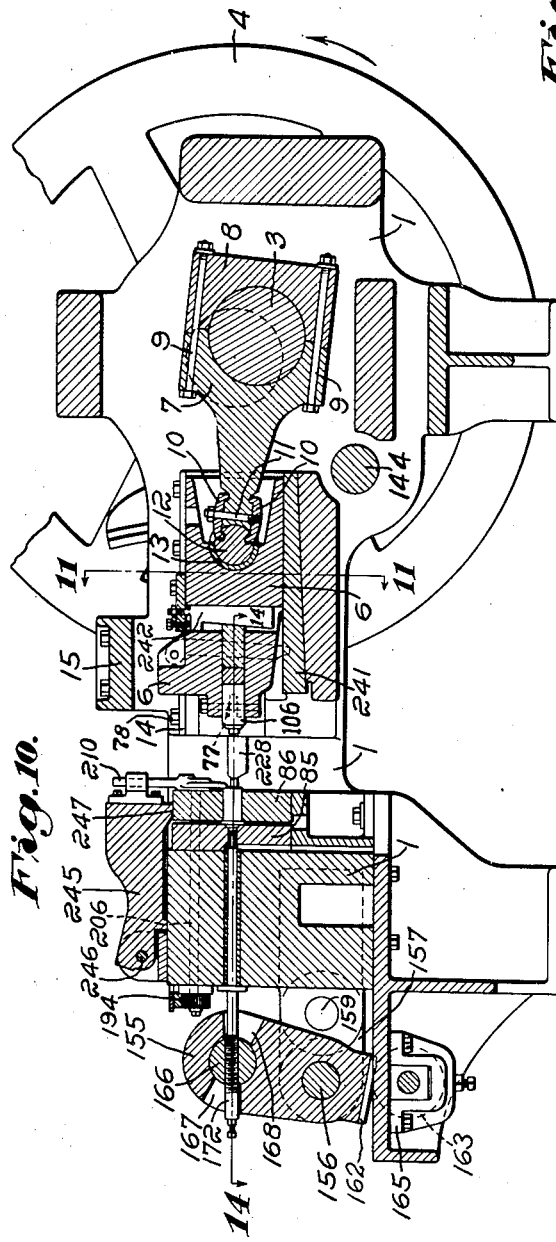
Inventor:
Louis S. Burbank,
by Emery, Booth, Janney & Varney
Attys.

Dec. 27, 1932. L. S. BURBANK 1,892,445
MACHINE FOR PRODUCING BOLTS, SCREWS, AND THE LIKE
Filed June 7, 1928 10 Sheets-Sheet 6
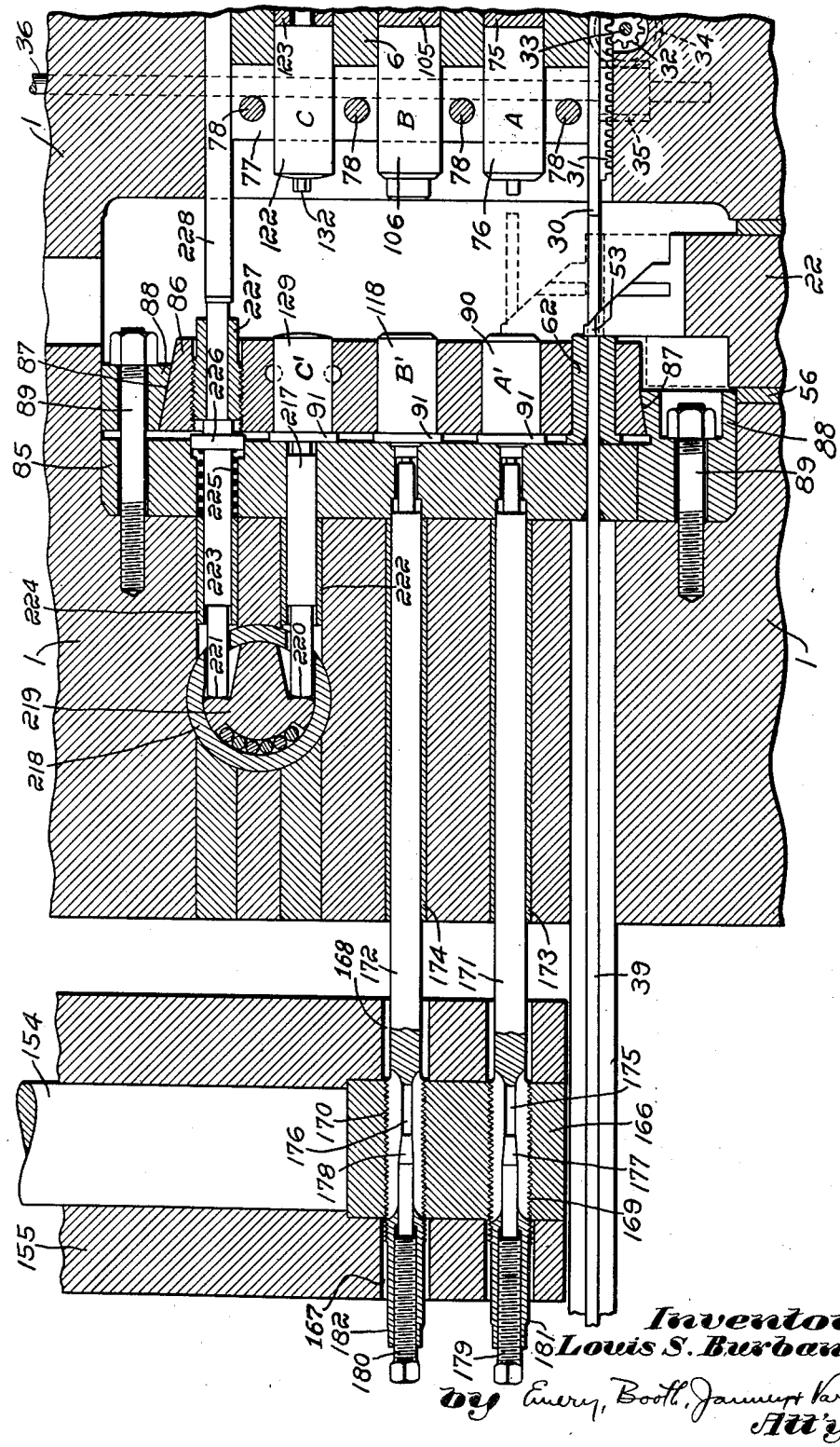
*Inventor:*
*Louis S. Burbank,*
by Emery, Booth, Janney & Varney
Att'ys.

Dec. 27, 1932.  L. S. BURBANK  1,892,445
MACHINE FOR PRODUCING BOLTS, SCREWS, AND THE LIKE
Filed June 7, 1928  10 Sheets-Sheet 7
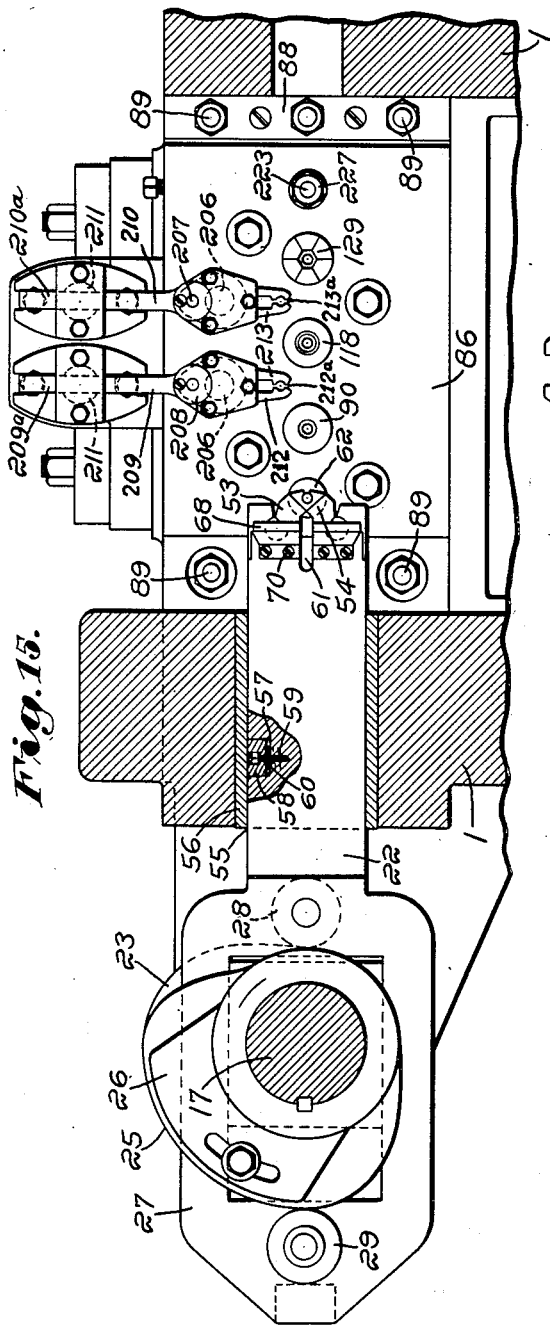
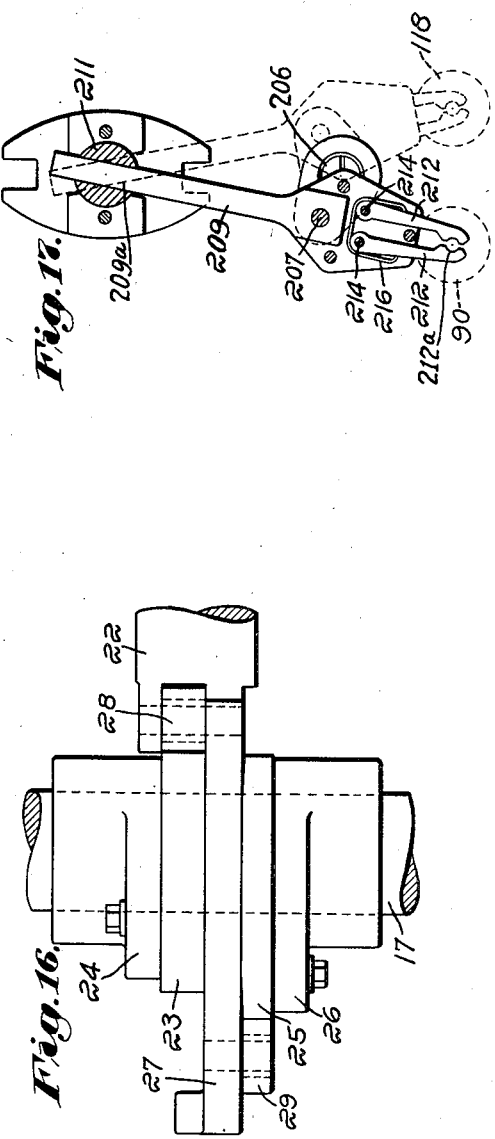
Inventor:
Louis S. Burbank,
by Emery, Booth, Janney & Varney
Attys.

Dec. 27, 1932.   L. S. BURBANK   1,892,445
MACHINE FOR PRODUCING BOLTS, SCREWS, AND THE LIKE
Filed June 7, 1928   10 Sheets-Sheet 8

Inventor:
Louis S. Burbank,
by Emery, Booth,
Janney & Varney
Attys.

Dec. 27, 1932.     L. S. BURBANK     1,892,445
MACHINE FOR PRODUCING BOLTS, SCREWS, AND THE LIKE
Filed June 7, 1928     10 Sheets-Sheet 9
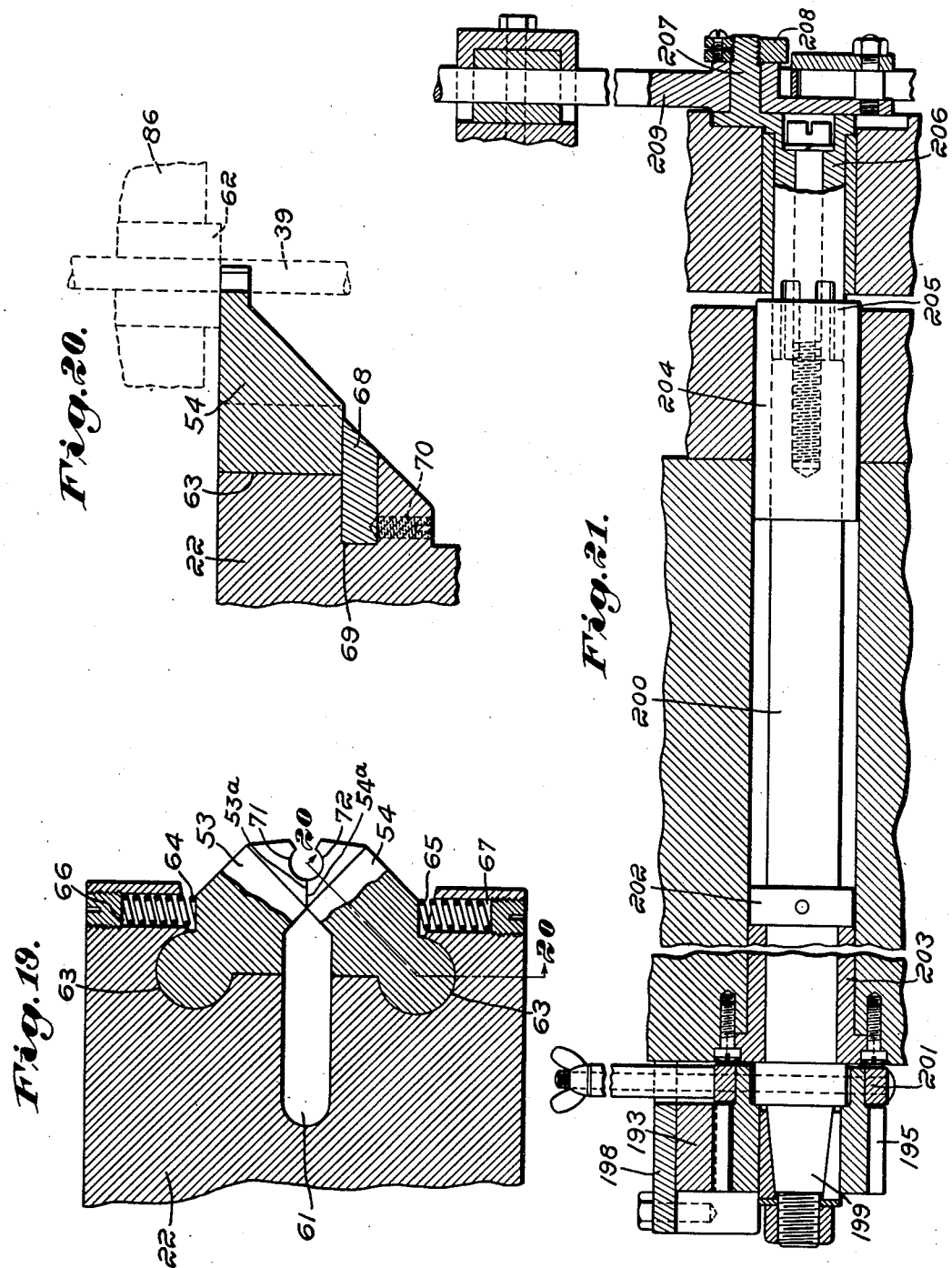
Inventor:
Louis S. Burbank,
by Emery, Booth, Janney & Varney
Att'ys.

Dec. 27, 1932.   L. S. BURBANK   1,892,445
MACHINE FOR PRODUCING BOLTS, SCREWS, AND THE LIKE
Filed June 7, 1928   10 Sheets-Sheet 10
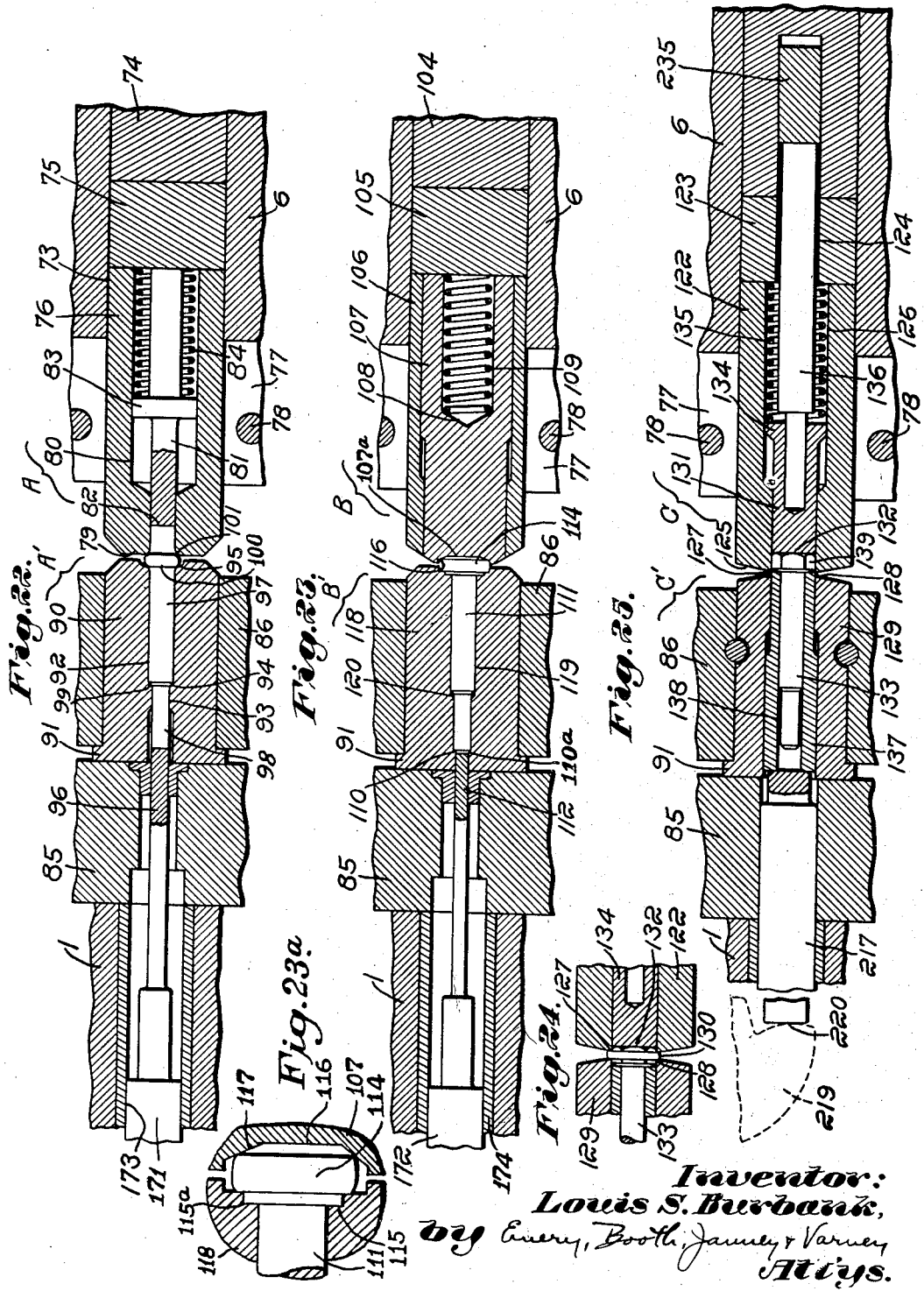

Patented Dec. 27, 1932

1,892,445

UNITED STATES PATENT OFFICE

LOUIS S. BURBANK, OF WORCESTER, MASSACHUSETTS, ASSIGNOR, BY MESNE ASSIGNMENTS, TO THE WATERBURY FARREL FOUNDRY AND MACHINE COMPANY, OF WATERBURY, CONNECTICUT, A CORPORATION OF CONNECTICUT

MACHINE FOR PRODUCING BOLTS, SCREWS, AND THE LIKE

Application filed June 7, 1928. Serial No. 283,469.

This invention relates to headers or upsetting machines of the type wherein a plurality of blows are required to produce articles of predetermined shape from a cylindrical blank.

The article specifically disclosed as made by the mechanism of this invention is a cap screw, bolt or the like but the invention is in no wise limited to such specific disclosure.

In order that the principle of the invention may be readily understood, I have in the accompanying drawings disclosed one embodiment of the mechanism of my invention.

In said drawings,—

Fig. 1 is a plan view of the machine;

Fig. 2 is an elevation of the machine as viewed from the lower side of the sheet containing Fig. 1;

Figure 7:
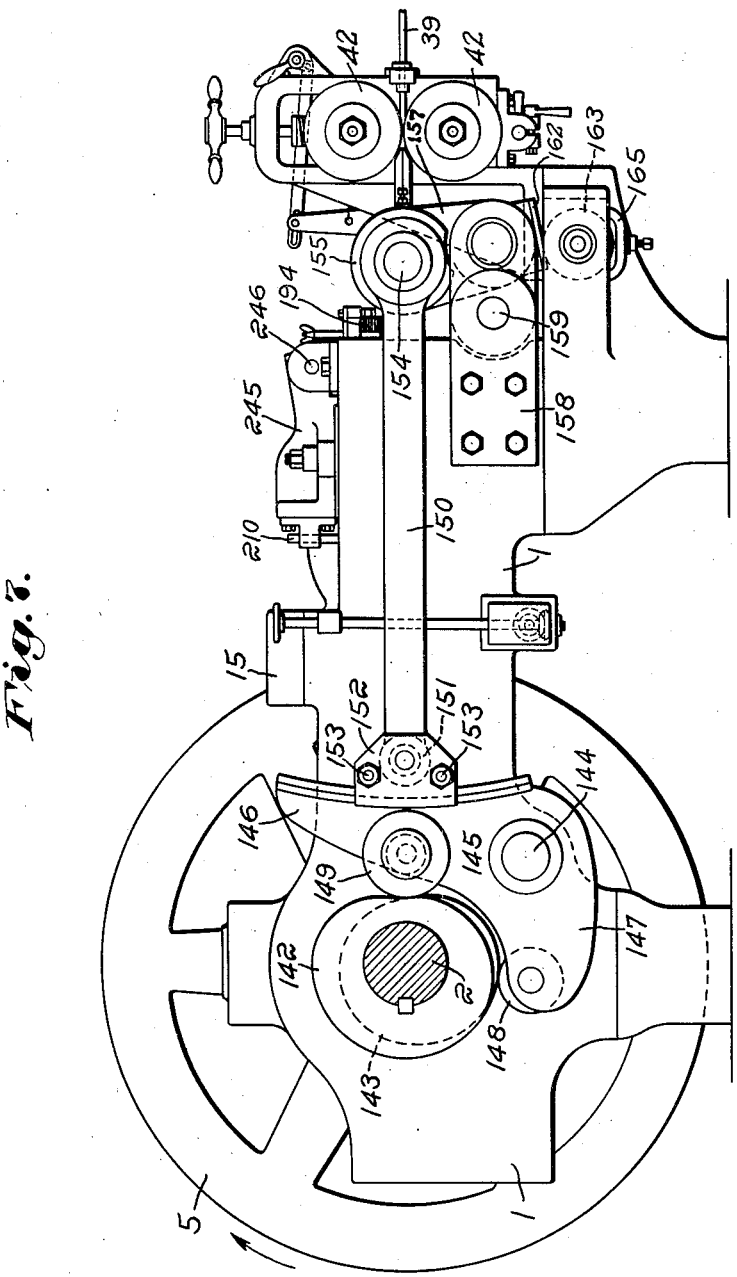
Figure 16:
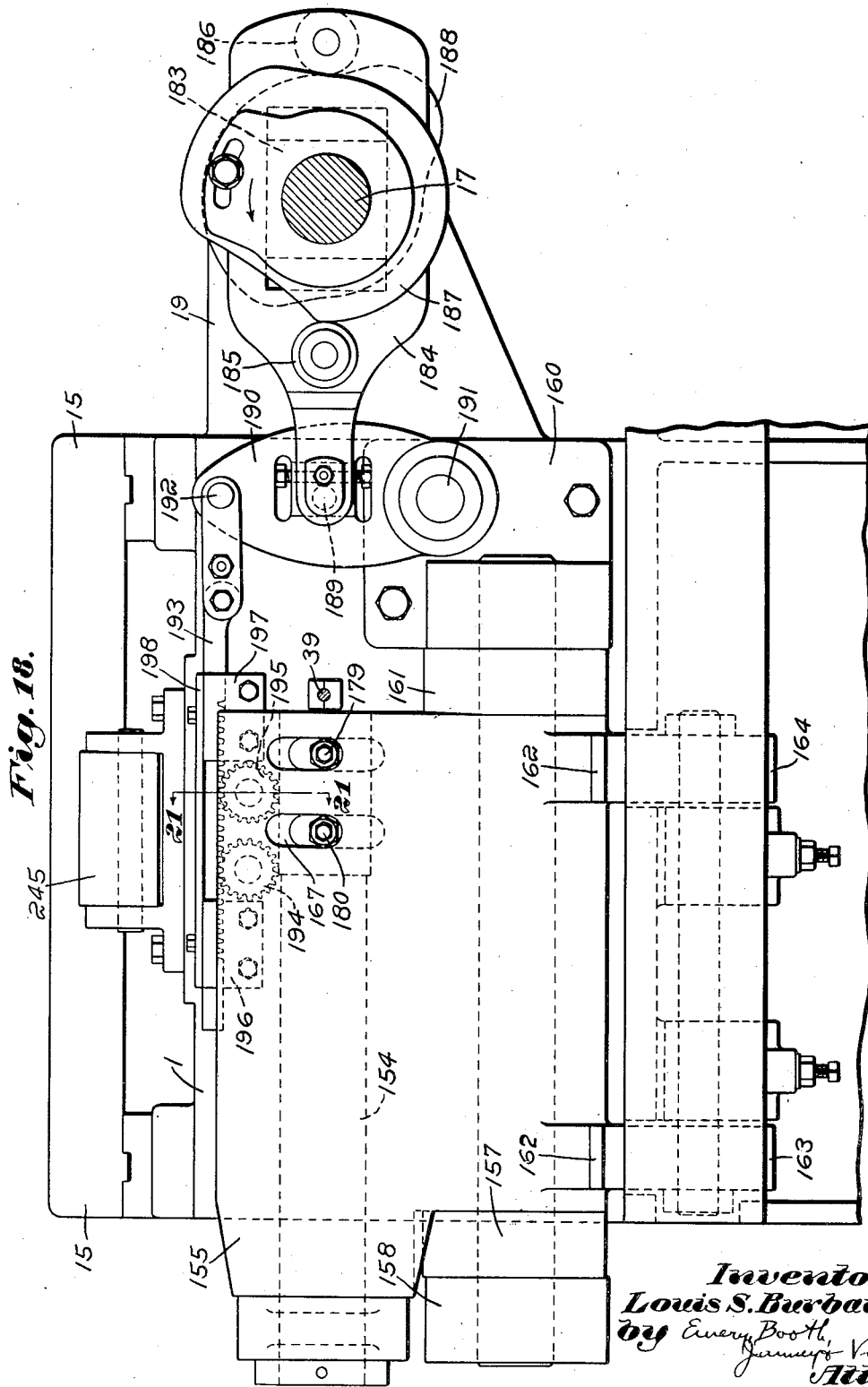

Figs. 3 to 6 inclusive are views in side and end elevation (Fig. 3 being partly in section) representing the article of my invention in its several steps of manufacture;

Fig. 7 is a side elevation of the machine viewed from the side opposite that from which Fig. 2 is taken;

Fig. 8 is a detail in end elevation of the wire feeding end of the machine;

Fig. 9 is a side elevation thereof viewed from the right of Fig. 8;

Fig. 10 is a vertical longitudinal section on the line 10—10 of Fig. 1;

Fig. 11 is a cross section taken through the machine upon the line 11—11 of Fig. 10;

Fig. 12 is a longitudinal section upon the line 12—12 of Fig. 11 and looking toward the right in said figure;

Fig. 13 is a longitudinal section taken upon the line 13—13 of Fig. 11 and looking toward the right in said figure;

Fig. 14 is a horizontal longitudinal section on the line 14—14 of Fig. 10 and looking downward in said figure;

Fig. 15 is a vertical transverse section upon an enlarged scale on the line 15—15, Fig. 1, and looking toward the left in said figure;

Fig. 16 is a detail in plan of the cams for operating the cut-off slide;

Fig. 17 is an enlarged detail of one of the transfer fingers, and showing said finger in line with one of the dies;

Fig. 18 is a view, mainly in elevation, but partly in section on the line 18—18 of Fig. 1 and looking toward the right in said figure, said figure showing upon an enlarged scale the mechanism for operating the transfer fingers;

Fig. 19 is an enlarged vertical transverse section of the wire cutting-off jaws;

Fig. 20 is a section upon the irregular line 20—20 of Fig. 19;

Fig. 21 is a vertical section upon the line 21—21 of Fig. 18, looking toward the left in said figure and showing the transfer fingers-operating shaft and immediately cooperating parts;

Figs. 22, 23, 24 and 25 are views in longitudinal section of three punches and their cooperating dies acting separately upon the same slug or blank, although as shown in Fig. 14 the punches and dies actually operate simultaneously upon successive slugs or blanks;

Fig. 23a is an enlarged fragmentary view of the head portion of a blank positioned between the punch and die when in one of their relative positions; and Fig. 26 is a diagrammatic view of the several sets of punches and dies, with a blank in each set and illustrating the successive forms it assumes while passing through the machine.

The present invention relates to machines known as headers or upsetting machines, these being adapted to operate upon pieces of metal generally known as blanks to shape each blank and change the form thereof to produce a commercial product, which either may be a bolt, cap screw or other like article.

In general practice machines of this type heretofore constructed have generally required several operations on a blank in sequence, that is, a single blank is operated upon separately and discharged from the machine before another blank is cut and operated upon, thus limiting the production of the machine to the rapidity with which the several steps can be performed successively upon each blank.

As contrasted to the above described manner of operation, the machine of the present invention is adapted to simultaneously perform a number of different operations upon a corresponding number of individual blanks, so that when one set is in operation the machine has at all times a number of different blanks in various stages of completion, and so is adapted to discharge finished blanks coincident with the performance of operations on other blanks. Thus, at each revolution of the driving element, a blank is cut from the stock supply at one station, a number of previously cut blanks are acted upon by a co-operating punch, and die devices or the like at other stations, and a finished blank is discharged from the machine. As a result the rate of production of the machine is very high.

The present machine is also capable of performing operations on a blank which have heretofore required another machine, thereby minimizing the cost of production in the utilization of a single machine instead of two or more machines. Thus, at every stroke of the machine a new blank is fed thereinto, each of the dies holds a blank for tool operations, and a complete finished article is produced.

The mechanisms are hereinafter described so far as possible in the order in which they act upon the slug or blank passing through the machine.

Referring more particularly to the drawings in which like characters of reference indicate like parts in the several figures, the frame of the machine is indicated by the numeral 1. In suitable bearings therein is mounted the crank shaft 2, clearly shown in Fig. 1, and thereon, preferably at substantially midlength, is formed the crank arm 3. At each end of the crank shaft are the fly wheels 4, 5, the former being the driver, and being itself driven by motor, belt or otherwise.

The crank arm 3 is operatively connected to the slide 6 by a pitman 7 having a cap 8 secured thereto by bolts 9. The pitman 7 is secured by plates 10, bolts 11, or similar means to a shaft 12 mounted in a bushing 13 in the slide 6. Suitable guideways 14 on the frame hold the slide against displacement during its reciprocation. A bridge member 15 spans the frame 1 above the slide 6, being secured by bolts 16 or the like, and prevents any tendency of the side portions of the frame to spring apart.

A cam shaft 17 is mounted in suitable bearings 18 and 19 upon the frame 1 and secured thereon is a mitre wheel 20 meshing with and driven by a similar mitre wheel 21 upon the crank shaft 2.

Movable transversely with respect to said cam shaft 17, is the slug or blank cut-off slide 22 (Figs. 1 and 15) which is moved inwardly to effect cutting off the wire by a cut-off slide cam 23 having an adjustable part 24, and is returned by a separate cam 25 having an adjustable part 26. The end of the cut-off slide 22 is formed as a yoke 27 surrounding the cam shaft 17 and having a roll 28 to be engaged by the projecting cam 23 and a roll 29 to be engaged by the return cam 25. The cams 23 and 25 are fast upon the cam shaft 17. The cut-off slide carries the slug or blank after being severed from the inner end of the wire. Wire stops, as heretofore made so far as I am aware, were either movable stops which rocked or moved into the path of the forward feeding wire until the latter stopped, then immediately rocked out of such path, in order to get out of the way of the on-coming punch, or else the wire stops were made stationary and extended through the head of the machine. In either case, the wire stops were fastened in the head of the machine by a stem extending clear through the head or front of the machine where an adjusting means was provided. I have provided a wire stop (shown most clearly in Figs. 1 and 14), the principal features of advantage whereof are that it does not extend through the head of the machine. It is stationary, and hence does not wear itself loose by rapid oscillatory motion, and it is adapted for convenient adjustment while the machine is running.

As shown in said Figs. 1 and 14, the wire stop 30, which is mounted in the frame 1, is provided at one edge with teeth 31 that mesh into the teeth on a pinion 32 on a shaft 33 carrying a worm wheel 34 meshing with a worm 35 fast on a worm shaft 36 indicated in dotted lines in Fig. 14. Upon the end of said shaft 36 is a beveled gear (not shown) but positioned in a suitable box and meshing with a suitable gear fast upon an upright shaft 37, most clearly shown in Fig. 1. On the upper end of shaft 37 is a hand wheel 38 by the turning of which in the proper direction, the wire stop is advanced or withdrawn as desired, to permit the feeding of a longer or shorter length wire from which the slug or blank is to be cut. The wire feeding means is adjustable to feed the required length of wire for each slug or blank.

The said wire stop is held positively by the worm gear, and the hand wheel 38 is desirably kept from moving by a slight friction. Within the scope of my invention, the particular mechanism extending from the wire stop to the hand wheel may be varied as desired.

Because the longest blank cannot be carried or moved by the cut-off slide until the punch of the then receding slide has cleared the end of the blank, I prefer to use one cam for pushing the blank forward, that is, for imparting the projecting movement to the cut-off slide and to employ a separate return cam. For this reason I have employed the cams 23 and 25, already referred to, and have provided a controllable adjustment of or for the time in which the blank is cut off and moved across the machine. Inasmuch as the cut-off slide dwells longer with short blanks than with long blanks while the punch is coming forward to hold them, I prefer to have a controllable adjustment in the timing of the return cam. For such reason I have provided the adjustable portions 24, 26 of said cams 23, 25 respectively. In the disclosed embodiment of means for operating the cut-off slide, the return part of each cam is cut away, so that there will be no complication in the positive action of the cams.

It is thus possible to have the cam 23 push the cut-off slide 22 inward at the full range of change and to have the cam 25 push the cut-off slide 22 outward under its full range of change without conflict of action of the two cams, one with the other, upon the rolls 28, 29 on the yoke 27.

In the arrangement of parts here disclosed, there is a time, shortly previous to and shortly following the time when the changing or sliding period of the cut-off slide 22 is taking place that only one of the said rolls 28, 29 is in contact with the driving mechanism. In order to prevent any rebound or shifting out of position of the cut-off slide at either end of its stroke and to hold it steady after it has become somewhat worn, I employ friction means (later described) to hold said cut-off slide 22 steady at either end of its stroke.

The material from which the finished product is made is preferably provided in the form of a wire 39, shown in Fig. 1 as coiled upon a reel 40 mounted on a shaft 41. Said reel is so positioned that the wire 39 may be drawn from the reel by feeding means of any suitable type, (see Fig. 1) as a pair of grooved feed rolls 42. These rolls are respectively mounted upon shafts 43, 44 shown in the enlarged views, Figs. 8 and 9, and which, as well as the means for operating the same, need not be described in detail, since my invention is not limited to any particular means for feeding the wire.

It is sufficient for the purposes of the present disclosure to state that the shafts 43, 44 are suitably mounted in the frame, and the feed rolls tightly engage or grip the wire 39, so as to draw it from the roll 41.

Fast upon the shafts 43, 44, are the gears 45, 46 meshing with each other and turned intermittently in a wire feeding direction by any suitable means, as, for example, by a ratchet wheel 47, with which is adapted to engage a pawl 48 mounted upon a pawl carrier 49 pivoted at 50 upon a member 51 loosely pivoted upon the shaft 44 and adapted to be operated by means of the connecting rod 52, shown most clearly in Fig. 1 as connected at one end to said member 51 and at its opposite end pivotally connected to the crank shaft 2, and desirably in such manner that the length of throw may be varied to secure different lengths of blanks.

Having now sufficiently described the wire feeding means, it is noted that the wire may be fed by the feed rolls through a guide desirably composed of upper and lower parts grooved for the reception of the wire. The wire fed inwardly as described is brought at its inner end against the wire stop 30 directly in horizontal line with the said wire. Desirably the feed rolls slightly overfeed and then slip so as to insure the full amount of feed and to bring the end of the wire 39 fully against the stop 30.

After the end of the wire has been fed against the stop 30, that portion thereof projecting beyond the bushing 62 is severed through the action of the cut-off slide 22. On this slide are the knives 53—54 (Fig. 19), which not only perform the function of cutting off the wire but hold the blank as so cut off and carry it in front of the first die A' (see Fig. 14). Thereafter the co-operating punch A, through the movement of the slide 6, forces the blank into the die A'. As the blank moves into the die, the cut-off slide 22 recedes and the knives clear the on-coming punch. When punch A moves away from die A' a knockout mechanism, hereinafter described, forces the blank out of the die, which is taken by transfer finger and carried into position opposite the die B', and a new blank, just severed from the wire 39, is moved into line with the die A'.

The said cut-off slide 22 is mounted for sliding or in and out movement in the frame 1, which, as shown most clearly in Fig. 15, is suitably recessed at 55 for the purpose, a bushing 56 being provided for wear. If desired, a packing or other suitable friction member may be employed upon the slide to prevent lost motion. Herein for the purpose I have, in Fig. 15, represented the cut-off slide as having in its surface a recess 57 elongated circumferentially of the slide and receiving therein a suitable packing or friction member 58 secured in position by a bolt 59, a compression spring 60 being employed to force the friction member 58 outwardly against the bushing 56.

The cut-off slide 22 is provided with a gap or opening 61 which extends for a sufficient distance in a direction lengthwise of, but transversely to, the cut-off slide, so as to permit the wire 39 to continue to feed uninterruptedly during the inward movement of the slide.

The cut-off slide 22 is recessed or socketed at opposite sides of the gap 61, as indicated at 63, to receive for rocking movement the knives 53, 54. These knives are normally swung or held toward or in contact with each other, as indicated in Fig. 19, by two coiled springs 64, 65, held in suitable sockets 66, 67, in the cut-off slide 22. Each knife is, in assembling the parts in accordance with the disclosed construction, slid transversely into one of the pivotal sockets 62, 63, and is retained therein by a suitable holding plate 68, within a suitable recess 69 and held in position by a screw 70. The knives 53, 54 are provided with cutting ends shaped as indicated in Fig. 19, and each concaved or recessed as indicated at 71, 72, so as to serve also to grip and retain the slug or blank, after the same has been cut from the wire 39.

During the return movement of the cut-off slide 22 the knives 53—54 open outwardly to pass over the stationary wire 39 and close thereon, with that portion of the wire 39 projecting beyond the bushing 62 within the notches 71—72. As the cut-off slide 22 moves forward again the reaction of the stationary wire 39 in said bushing exerts a force on the knives 53—54 which tends to close them more tightly and engage each other at the surfaces 53a—54a and remain substantially rigid as the movement of the slide continues.

During the return movement of the cut-off slide 22, the knives 53—54 readily open against their closing springs 64—65 as they pass over the blank held by the punch A and die A'. The slide 6 carries punches or hammers, which as shown herein, are three in number, arranged in a substantially straight line transversely of the machine, and generally indicated as A, B and C. While three of such punches or hammers are shown the machine is in nowise limited thereto. The corresponding dies are generally indicated as A', B', C' and are fixed relative to the frame 1.

The several parts of the punches A, B, and C are seated in open-ended sockets or recesses in the slide 6. The socket for the punch A is indicated at 73, and receives two blocks 74, 75 and the punch member 76 which projects beyond the wall of the slide 6 and has a flat face 79. As most clearly shown in Figs. 10 and 14, the inner end of the slide 6 is horizontally slotted from side to side, as indicated at 77, and through the portions of the slide 6 above and below said slot are passed a series of tie bolts 78, whereby the punches are held tightly or firmly in position by the slight compression of the metal of the slide above and below the slot 77. In the punch member 76 is an opening 80, to receive a plunger 81 having a flat forward end 82 and an annular shoulder 83 between its ends. Between said shoulder and the block 75 is positioned a stout coiled spring 84 tending to force said plunger 81 forward. The principal purpose of the plunger 81 is to push the shank of the blank into the die 90.

Without at this point describing in detail the construction and operation of all the parts pertaining to or cooperating with the several dies A', B', C', it is pointed out that the frame 1 of the machine is suitably recessed or formed to receive a die backing block 85 having suitable openings therein and shown most clearly in Fig. 14 as positioned against the base of said recess in the frame 1. In advance of the die backing block 85 and adjacent thereto, is the die block 86 having openings therein. The said die block 86 has two tapered or beveled sides, as indicated at 87, and is held in place by die block wedges 88 each having a beveled or tapered inner face and itself held in position by a series of bolts 89 passing therethrough and through the block 85 and tapped into the frame, as indicated in Fig. 14.

The die A' essentially comprises a die member 90 which at its basal end is provided with an annular shoulder or flange 91 engaged by the rear wall of the block 86. The dies B', C' are provided with similar annular flanges or shoulders 91, and they are all held thereby fixedly in position.

The said die member 90 of the die A' is provided with an axial opening 92 an extruding throat 93, just in advance of which is a beveled shoulder 94, and a slightly enlarged, flaring or rounded mouth 95 of the opening 92.

Received within or in alignment with the opening 92 of the said die member 90 is the stop end 96 of a knock-out rod or pin 171, to be hereinafter referred to. The slug or blank is presented by the knives 53 and 54 in alignment with the plunger 81 and the first die A' while there is open space therebetween and is forced into the die during the next forward movement of the slide. It is then positioned between the plunger 81 and the stop 96. As the blank 97 is moved into the die opening 92 by the plunger 81 and punch 86, the inner end thereof is forced through the extruding throat 93 of the die, thereby extruding the end portion of the blank to a diameter the same as that of the throat, as indicated at 98, in Fig. 3. The movement of the blank into the die continues until the inner end thereof engages a stationary stop which is the end of the knockout rod 96 that extends into the throat 93. Because of the force with which the blank 97 is driven into the die and reduced by the throat 93 until it comes to rest, there is formed on the blank at the inner end of the reduced portion 98, a beveled shoulder indicated at 99 in Fig. 3, the slope of the shoulder 99 being determined by the inclination of the shoulder 94 between the main die opening 92 and the reduced throat 93. As shown, the inclination of this shoulder is approximately 30°, which has been found to be the proper angle for bringing about a ready reduction of the blank by extrusion of the metal of the blank at the throat 93.

After the advancing end of the blank 97 reaches the stationary stop 96, and therefore can enter the die A' no further, the remainder of the forward motion of the punch A is utilized to upset the portion of the blank extending outside of the die opening 92 to form a preliminary head on the blank. As previously pointed out, the mouth of the die opening 92 is flared outwardly as indicated at 95, while the mouth of the opening 80 of the punch member 76 is slightly tapered as indicated at 101. Therefore when the blank comes to rest against the stop 96 following the extruding operation, the metal of the blank between the end of the plunger 81 and the die opening 92 is upset to form a preliminary head 100 of tapering form, the metal flowing freely into the flaring mouth 95 of the opening 92 without engaging the walls of the mouth. When the slide 6 carrying the punch A recedes, there being ordinarily more friction in the die than in the punch, the blank 97 remains in the die A' and after the punch A has receded sufficiently, the knockout 96 forces out the blank in a manner to be hereinafter described. The expelled blank is then acted upon by a set of transfer fingers, also hereinafter described, which move the blank into alinement with the second punch and die B and B'. For the convenience of description at this point, the details of the knock-out and transfer mechanisms are omitted.

Within the socket or recess for the second punch B are positioned the two blocks 104 and 105. In advance thereof are the two parts of the second punch B, namely, the sleeve-like part 106 and the hammer-like or piston-like part 107, which is recessed, as indicated at 108, to receive the relatively heavy coiled spring 109, the function whereof is to project the said hammer or piston-like part 107 so as to engage the slug or blank while the same is held by the proper transfer fingers hereinafter described.

The punch and die B, B' embody certain important novel features. The extreme inner end of the die B' is contracted on an angle, as indicated at 110, to form the bevel 110a at the end or the point of the blank, now indicated by the numeral 111 in Fig. 23. The end 112 of the knock-out rod or pin 172 is positioned at the end of the said bevel 110a, as clearly indicated in Fig. 23, so as to form the flat end 113 of the point of the slug or blank, as indicated in Fig. 4.

The depth of the opening 119 of the die 118, that is the depth to the knock-out pin or stop 112, is less than the length of the incoming blank 97 as withdrawn from the die A'. Furthermore, the length of the reduced portion of the die opening 119 between the stop 112 and a bevel 120 between the portions of the die opening of different diameters is less than the extruded tenon portion 98, of the blank 97. Consequently, the impact of the punch B on the inserted blank 97 results in thoroughly flattening the end of the blank as indicated in 113, Fig. 4 and in beveling the corner at the end of the blank, as indicated in 110a, thus finishing the end of the blank. The impact of the punch also tends to set the particles of the metal of the blank more firmly together so as to form a tough cold forged point. Practically simultaneous with the flattening and beveling at the end of the blank, now designated 111, the portion of the blank at the inner end of the reduced portion 98 shown as beveled at 99 in Fig. 3, is forced into engagement with the beveled shoulder 120 in the die 118 to change the angle of the bevel 99 from approximately 30° to 60°. As previously pointed out, the original angle of the bevel 99, about 30°, is the best angle for extruding the reduced portion and the change of this angle to approximately 60° is made for the purpose of approximating the angle of the threads which are finally rolled on the completed blank, as indicated in Fig. 6.

Following the finishing of the end of the blank and the changing of the bevel as described above, the punch B completes its stroke, thus further upsetting and changing the preliminary head 100 from a tapering form to a generally cylindrical form, as indicated at 114 in Fig. 4. This further formation of the head also forms the washer face 115 on the underside of the head 114, which face 115 makes a sharp corner between the head 114 and body as well as a flat top 116 and bevel 117 at the other end of the head, see Fig. 23a. The washer face 115 is formed by the provision of an annular groove 115a at the mouth of the die opening 119, beyond which the mouth of the opening extends outwardly so as to permit free flowing of the metal during the second upsetting operation. The end of the punch 107 provides a recess or seat 107a for forming the flat top 116 and bevel 117 on the blank, the rim of the seat 107a being flared outwardly beyond the bevel to also permit free flowing of the metal during the second upsetting operation, which results in the formation of a generally cylindrical head with opposed finished faces 115 and 116 and the bevel 117.

In the construction and operation of the punch and die B, B', I may sink the head of the blank either entirely into the die B' or entirely into the punch B, or I may fit the said head part way into each of said parts (the punch and die B, B') so as sufficiently to centralize the outward flowing head metal, and thus keep the said head finally centralized with respect to the body portion of the slug or blank, so as to eliminate waste and trimming. The said third operation is the one represented in Figs. 24 and 25, but to which my invention is not limited.

When the slide 6 again recedes, carrying back the punch B (as well as the other punches), a second pair of transfer fingers (to be described) grip the slug or blank 111 which is forced outward by the knock-out rod 172, while at the same time the transfer fingers previously referred to are gripping a new slug or blank 97 issuing from the die A′, and are transferring the same into position to be acted upon by the punch and die B, B′.

Referring next to the punch and die C, C′, it is pointed out that, in the embodiment of the invention shown, the third punch and die C, C′ act also to trim the polygonal sides from the cylindrical head 114, so as to form the regular polygonal part of the head which, for convenience of description, will be referred to as the hex-head. It is clearly to be understood, however, that my invention is in no-wise limited to the utilization of such punch and die, or either of them to trim the head, as I may prefer to employ a punch and die C, C′, which will not trim the head, that function being, if desired, performed at a later stage, in which case I would employ a knock-out rod similar to the knock-out rods 171 and 172 to eject the blank from the die C′. In the disclosed embodiment of the invention, however, I have shown the punch and die C, C′ as formed at their inner or co-acting ends, so that they will trim the head 114 in the novel way now to be described.

Within the socket or recess for the third punch C, there is positioned a knock-out member, and in advance thereof there is positioned the main punch member 122 in the rear of which, if desired, may be positioned a block 123 having an axial opening 124. The said punch member 122 has a beveled end 125 and an axial opening 126 extending therethrough, thus providing a cutting edge 127 shown as polygonal in form to cooperate with a similar edge 128 upon the die member 129, and by the conjoint action of which two edges the trimming 130 (see Fig. 24) is removed from the periphery of the head 114. Located within the punch member 122 is a plunger 131, the forward end 132 of which impacts against the head of the slug or blank, the latter now being designated as 133 in Figs. 5 and 25. The said plunger 131 has an enlarged inner end or base 134, between which and the block 123 is positioned a coiled spring 135. The said plunger 131 is socketed or provided with an axial opening extending part way only therethrough to receive the ejector pin 136.

The said die member 129 is provided with a shoulder 91 as described. Unlike the first and second dies A′, B′, the third die member 129 has a large axial opening therethrough to receive the die guide punch 137, the internal diameter of the axial opening through which is uniform, as indicated at 138. Therein it receives the slug or blank 133, and in the inward movement of the die guide punch 137 the said trimming 130 is removed.

When the slug or blank is transferred to the die C′, it enters the said die guide punch 137, the function whereof is (first) to centralize the in-coming slug or blank 133, so that the head about to be trimmed or hexed shall be in the centre of the completed bolt or screw, and (second) to perform its function as a punch to force the head at the proper time into the heading member commonly called the punch (that is, the punch C).

The object of trimming or slabbing the head 114 by the described method is principally that, to do it in such manner avoids any necessity for a subsequent shave in a shaving machine, and there is no burr left at either the top or the bottom of the head when removed from the third punch and die. In order to prevent the formation of a burr and in order to make a commercial article, I bring the cutting edges 127 and 128 of both the punch and the die C, C′ up against the top and bottom respectively of the blank head 114 and start the cutting of the head from both the top and the bottom at the same instant. The result is so to break the surface of the metal from both sides that no fin or burr can appear.

During the said trimming process, that is, while the punch and die C, C′ are slicing off the slabs from the head 114, I move the die guide punch 137 inward (the parts being suitably timed to effect this), with the result that the head 139 (see Figs. 5 and 25) of the bolt or screw 133 is pushed away from the scarf that is being made by the die member 129, so that the scarf that is being made by the third punch member 122 passes by the scarf started by the die member 129. The die guide punch 137 is finally projected so far beyond the cutting edge 128 of the die member 129 that the head 139 of the bolt 133 enters completely into the punch member 122 compressing, as it does so, the plunger 131 against its spring 135.

A further advantage of the described method of trimming cap screws, bolts or other heads is the following. It is not sufficient in manufacturing cap screws, bolts and the like merely to slice off the polygonal sides of the head, inasmuch as the scarf made by the trimming edges leaves a surface that is too rough for practical or commercial purposes. Prior to my invention, it has been the practice, therefore, in making cap screw heads, either to use two dies, one to trim and the other to burnish the surface, or else to push the cap screw clear through either the punch or the die. The first of these procedures requires special tools, and the latter procedure requires a special crank motion or special cam motion.

In accordance with my invention, the trimmed head 139 is burnished by forcing it into the punch member 122, the internal surface whereof is left parallel for the purpose, and by then forcing the said head 139 out again. Thus the trimmed surfaces of the head 139 are burnished.

When the forward stroke of the slide 6 is completed, the position of the punch C and the die member 129 is that shown in Fig. 25. When the slide 6 is moved outwardly, there being no resistance in the die C', the cap screw 133 is pulled out of the die C' by the punch member 122.

The bolt or other article now has the form shown in Fig. 5, and thereafter it remains merely to form the threaded portion 103 thereon. This is done in any suitable manner and need not be described. It will be evident from the description that the bolt or screw 133 not only is provided with a cold swaged or forged point at 110a, 113, but it is provided with a cold swaged washer face 115 under the head 139 and with a cold swaged head top 140, as well as the cold swaged reduced portion for thread rolling. It is also evident that the bolt or screw 133 has been cold swaged first over the rounded corner 95 of the die mouth A' and later over the sharp corner of the groove 115a at the die mouth B'.

The knock-out mechanisms for the first and second dies A', B' are essentially the same in construction and will be described together. The knock-out mechanism for the third die C', in the disclosed embodiment of my invention, differs somewhat from that of the first and second dies, and will be described following the description of the operating means for trimming the head of the bolt or screw. The knock-out mechanism is best shown in Figs. 7, 10 and 14.

The main crank shaft 2, as shown clearly in Fig. 1, has formed therewith or fast thereon a knock-out cam 142 and a knock-out return cam 143, both shown in Fig. 7. Suitably mounted in the frame 1 is a stud shaft 144, loosely mounted thereon is a bell crank lever 145 having the two arms 146, 147. Upon the arm 147 is mounted the roll 148 which is in constant contact with the periphery of the knock-out cam 142. Upon the arm 146 is mounted the roll 149 which is constantly in contact with the periphery of the knock-out return cam 143. Thus, during the action of the cams 142, 143 the bell crank lever 145 is actuated to reciprocate the knock-out rods and their pins.

Operatively connected with the bell crank lever 145 is a knock-out reach rod or connecting rod 150 extending lengthwise of the machine. Said reach rod is connected in any suitable manner with the bell crank lever 145, preferably so as to provide means for accurate adjustment and the proper timing of the parts. For the purpose, I have, in Fig. 7, represented the end 151 of said reach rod as pivotally connected to and positioned between two plates 152, which are themselves connected by means of bolts 153 to the bell crank lever 145 desirably along a flanged edge thereof. By loosening the bolts 153, the plates 152 may be moved in an arc along the edge of the bell crank lever 145, so as to permit whatever change in movement or timing is necessary.

At its opposite end the said knock-out reach rod 150 is pivotally connected at 154 to an operating shaft, shown also in Fig. 14. Hung upon the said shaft is a knock-out operating lever 155, which at its lower end has pivotally connected thereto at 156 a pair of horizontal links 157 which themselves are pivoted respectively upon brackets secured to the frame 1. One of said brackets is indicated at 158 in Fig. 7, and the pivotal point of the link mounted therein is indicated at 159. The other of said brackets is indicated at 160 in Fig. 18, and the link supported in said bracket is indicated at 161. In order to insure a right line movement of the knock-out rods, I desirably provide the following mechanism whereby the lower end of the knock-out operating lever 155 is supported in its movements. The said knock-out lever 155 is provided with a pair of steel or other suitable plates 162, shown most clearly in Fig. 18. The said plates rest upon the two rolls 163, 164, respectively, which are mounted in suitable hangers 165 provided therefor at the under side of the frame 1, as represented most clearly in Figs. 10 and 18.

The knock-out lever 155 is suitably recessed for the reception of the knock-out rods for the first and second dies A', B'. Herein I have represented said knock-out operating lever 155 as recessed for the reception of a rotatable block 166, shown most clearly in Fig. 14, and said knock-out operating lever 155 is also recessed at 167, 168 to permit the swinging of said knock-out operating lever 155, see Fig. 18.

The block 166 has two through threaded passages 169, 170 to receive the threaded portions of the two knock-out rods 171, 172 for the first and second dies respectively. The said knock-out rods pass through suitable openings in the frame 1, being received if desired in suitable sleeves 173, 174. The said knock-out rods 171, 172 are positioned for accurate adjustment in the rotatable block 166. While any suitable means may be provided for this purpose, I have herein represented each of said rods as split lengthwise a short distance, as indicated at 175, 176, to receive the tapered ends 177, 178 of two adjusting set screws 179, 180. Said adjusting set screws 179, 180 are tapped into hexagonal or like sleeves 181, 182 threaded as shown to engage with the internal threads of the passages 169, 170. In this or in any other suitable manner, the position of the knock-out rods 171, 172 may be very accurately set, and in the swinging movement of the knock-out operating lever 155, the slugs or blanks are simultaneously ejected from the first and second dies A', B'.

Since, as described above, the plates 162 of the knock-out lever 155 rest upon the rolls 163 and 164 respectively, as best shown in Fig. 10, and since the lever is pivotally connected to both the shaft 154 and the links 157 and 161, movement of the shaft 154 by the connecting rod 150, as previously described, results in a straight line movement being imparted to the upper end of the lever 155. This results from the coaction between the surfaces of the rollers 163 and 164 and the plates 162 whereby, when the lever 155 is moved by the shaft 154, it also turns on the links so that the lower end of the lever is raised to compensate for the lowering of the shaft 154 which would otherwise occur if the pivotal support of the lever 155 were on a fixed axis. As a result of this compensating action, the shaft 154 moves in a substantially straight line.

In adjusting a knock-out mechanism for operation on blanks of different lengths, the connection between the operating lever 147 and the shaft 154, shown in Fig. 7, permits the length of the inward travel of the knock-out rods 171 and 172 to be closely controlled, without affecting the blank ejecting movement of the rods. It is evident from Fig. 7 that when the knock-out lever 155 is rocked forward by the cam 142 acting on the roller 148, the position of the left hand end of the connecting rod 150 on the lever arm 146 can be varied by means of the adjustable plates 152 which hold the end 151 of the rod 150. Since the arcuate portion of the lever arm 146, along which the plates 152 are shifted, has its center of curvature at the axis of the shaft 154, obviously adjustment of the rod 150 about this axis will not affect the extreme forward or blank ejecting position of the knock-out rods 171 and 172. On the other hand, shifting of the plates 152 will vary the distance between the axis of the pivot 144 of the bell crank lever 145 and the point of attachment of the rod 150 to the lever arm 146, thereby making it possible to vary the length of the rearward movement of the knock-out rods, from their extreme blank ejecting position, within a wide range. This makes it possible to operate on blanks of different length without disturbing in any way other adjustments of the machine.

While any suitable means may be provided to move or transfer the slugs or blanks from the first punch and die to the second, and from the second to the third, and without limiting myself to the employment of any particular number of punches and dies, I have disclosed the following transfer mechanism.

Upon the cam shaft 17 is loosely mounted a sliding block 183, shown in Fig. 18. Said block is received in a yoke 184 having thereon two rolls 185, 186 with which respectively cooperate the projecting cam 187 and the return cam 188 fast upon said cam shaft 17. At its inner end the said yoke is pivotally connected at 189 in any suitable (preferably adjustable) manner to the lever 190 for operating the transfer fingers. The said lever 190 is pivoted at 191 upon the frame 1 and at its opposite end, is pivotally connected by a link 192 with a rack bar 193, the teeth whereof engage two pinions 194, 195, shown in dotted lines in Fig. 18, and one of which is shown in Fig. 21. Said rack is provided with suitable guides 196, 197, 198. Each of the pinions 194, 195 is secured upon the tapered end 199 of its transfer-finger shaft 200, there being herein provided two such shafts. In order to prevent over movement of the transfer fingers, I provide some suitable friction device, as, for example, a friction band 201, shown in Fig. 21, as surrounding the hub of the pinion 194 or 195. Each shaft 200 has fast thereon a collar 202 bearing against a suitable bushing 203, wherein said transfer finger shaft rocks. Desirably I provide for each transfer finger shaft 200 a sleeve 204 pressed thereon and, for convenience of construction, I employ a tongue-and-fluted or other suitable connection 205 between the main part of each shaft 200 and the inner part 206 thereof. Preferably integral with said part 206 is a crank portion 207 onto which is secured in any suitable manner, as by a washer 208, a transfer finger arm 209, the upper end of which, as indicated at 209a in Fig. 17, extends upwardly through a suitable guide 211 which permits both longitudinal and pivotal movement of the associated transfer finger arm 209 when the arm is oscillated by the crank 207 between the full line and dotted line positions shown in Fig. 17. As shown in Fig. 15, a second transfer arm 210 is mounted adjacent to the transfer arm 209 in exactly the same manner as the arm 209 and the arms 209 and 210 are provided at their lower ends with pairs of transfer fingers 212 and 213 respectively. The pairs of fingers 212 and 213 are pivoted at 214 and 215 on their respective transfer arms and each pair of fingers 212 and 213 are yieldingly maintained towards each other by a bent spring 216. The fingers 212 and 213 also provide oppositely disposed notches 212a and 213a which are adapted to receive between them a blank when the arm 209 is moved to the full line position of Fig. 17. Consequently, when movement of the rack 193 throws the crank 207 from the full line position to the dotted line position in Fig. 17, the blank held between the fingers 212 is transferred from a position in register with the die 90 into a position shown in dotted lines it then being in register with the die 118. As previously pointed out, the transfer arm 210 is mounted in the same manner as the arm 209 so that its fingers 213 are adapted to move a blank in register with the die 118 into register with the die 129. In other words, following the ejection of blanks from the dies 90 and 118, respectively, the transfer fingers 212 and 213 are adapted to simultaneously move these blanks into register with the die 118 and die 129 respectively, and as soon as the incoming punches push the blanks into the die 118 and die 129, the transfer arms 209 and 210 swing upwardly to their neutral positions shown in Fig. 15, the fingers 212 and 213 yielding to free themselves of the blanks then held in the respective dies 118 and 129.

Thus each revolution of the drive shaft is adapted to impart a complete operating cycle to the transfer arms 209 and 210 starting from the neutral position shown in Fig. 15. In this cycle of movement, the arms 209 and 210 first move downwardly towards the die 90 and die 118 where the fingers 212 and 213 simultaneously engage the blanks, then the arms 209 and 210 swing upwardly and then downwardly to carry the blanks into register with the dies 118 and 129, after which the arms 209 and 210 swing upwardly back to the neutral position to complete the operating cycle.

Any suitable means may be provided to discharge the completed bolt or screw from the third die into the third punch and for ejecting the same from said third punch. For this purpose I have shown the following mechanism in Figs. 10 to 14 inclusive and in Fig. 25.

In Fig. 25 and elsewhere, the knock-out rod for the said third die is indicated at 217. At its inner end it engages the die guide punch 137 so as to move the same sufficiently to cause the now completed screw or bolt to be released or discharged from the said third die C' and to be moved back by the third punch C as the sliding head 6 begins its outward movement. The timing of the parts is such as to cause these movements to occur in the proper sequence.

Mounted in the frame 1, as shown in Fig. 14, is a short upright bushing 218 receiving a short rock shaft 219 cut away as indicated to provide shoulders 220 and 221, which engage respectively the knock-out rod 217 mounted in its bushing 222, and a rod 223 mounted in a bushing 224, in advance of which is a coil spring 225 engaging a collar 226 fast upon said rod 223.

The outer end of said rod 223 is received in a suitable bushing 227 mounted in the block 86. Said rod 223 is struck at the proper time by a rod 228, which, as shown in Fig. 13, is mounted in the frame 1. The construction is such that as the sliding head 6 moves inwardly, and substantially at the end of its inner stroke, it engages the end 229 of said rod 228 and thereby imparts lengthwise movement to the rod 223, rocking the shaft 219 and imparting lengthwise movement to the knock-out rod 217, as described. Desirably I provide means for varying the period of contact of the slide and the rod 228. Herein for the purpose I have shown a wedge 230 which may be adjusted up and down by the threaded stem and nut 231, a set screw 232 being provided to secure the wedge in adjusted position.

Preferably a similar wedge construction is provided in the rear of each of the three punches.

In order to eject the completed bolt or screw from the third punch in which it is now positioned, I preferably provide, as shown in Fig. 12, a lever 235 pivoted at 236 upon the slide 6, said lever at its lower end being connected by a coiled spring 237 to a pin 238 upon said slide. The inner edge of said lever 235 engages the outer end of the punch C, as indicated in Fig. 12. Said lever 235 at its lower end is adapted to engage, upon the return movement of the slide, a stop or shoulder 239 adjustably secured as indicated at 240 upon the fixed part 241 of the frame.

In the rear of the lever 235 is shown an adjustable wedge 242 generally similar to that shown in Fig. 13 and provided with adjusting means 243 and cooperating set screw 244.

It will be observed that in Fig. 10 a swinging head 245 is provided pivoted at 246 upon the frame and adapted at its outer end 247 to bear upon the block 86 and so hold the same down in position, but permitting ready access thereto. The said swinging head 245 is bolted down to the frame 1.

Having thus described the various parts and interrelated mechanisms entering into the machine there will now be described, as briefly as possible, the various operations that are carried on simultaneously during a complete operating cycle of the machine, or in other words, what occurs during one complete revolution of the driving shaft 2 from a given angular position. For convenience of description the operating cycle will be assumed as starting from the angular position of the driving shaft 2 in which the punch slide 6 is nearly withdrawn, as indicated in Fig. 1, at which moment the knives 53 and 54 have carried a cut blank 97 into register with the punch 90. At the same moment the transfer fingers 212 have carried a partially formed blank 97 into register with die 118 while the fingers 213 have carried a still further formed blank 111 into register with the punch 129, all as indicated diagrammatically in Fig. 26. At this moment also the stock feeding rolls have advanced the wire 39 through the cut-off bushing 62 towards engagement with the stop 30, the slot 61 in the cut-off slide 22 having permitted this feeding of the stock independently of slide 22.

During the forward movement of the slide 6 towards the die block, the punches 76, 106 and 122 simultaneously engage the blank cut from the wire 39 and the partially formed blanks 97 and 111 and force them into the die 90, die 118 and die 129, respectively. Inward movement of the punches 76, 106 and 122 thus simultaneously perform three different operations on blanks in various stages of completion, the details of which operations have been previously described. Suffice it to say, therefore, at this point that the stroke of the punch 76 converts the unformed cut blank 39 into the form shown in Fig. 3 with the reduced portion 98 partially formed and with the preliminary upset head 100. At the same time completion of the stroke of the punch 106 converts a partially formed blank 97 shown in Fig. 3 into the form shown in Fig. 4 wherein the end of the tenon 98a is finished at the end 113 and bevel 110a while the angle of the bevel 99 at the end of the tenon is changed from approximately 30° as shown in Fig. 3 to approximately 60° as shown in Fig. 4. Furthermore, the operation of the punch 106 transforms the preliminary head 100 from the tapering form shown in Fig. 3 to the cylindrical form shown in Fig. 4 with a finished washer face 115 and top 140. At the same time completion of the stroke of the punch 122 transforms the blank 111 from the condition shown in Fig. 4 to the condition shown in Fig. 5, wherein the cylindrical head 114 is trimmed into hexagonal or other desired form with smooth burnished faces.

Upon the approach of the punches 76, 106 and 122 to perform the above described operations, the cut-off slide 22 moves back after the previously cut blank has entered the die 90 and at the same time the transfer fingers 212 and 213 are swung upwardly to their neutral position as soon as the blanks are pushed into the dies 118 and 129 respectively, the parts then occupying the position shown in Fig. 15 so that there is no interference with the operation of the several punches. As the slide 6 withdraws the several punches, the knock-out rods 171 and 172 are operated to eject the partially formed blanks 97 and 111 from the die 90 and die 118, whereupon the transfer fingers 212 and 213 are swung downwardly to the left to seize the partially ejected blanks and thereafter swing them upwardly and to the right into register with the dies 118 and 129 respectively, as indicated diagrammatically in Fig. 26. As this occurs, the cut-off slide 22 is fully retracted so as to cause the knives 53 and 54 to embrace the previously fed wire 39 while at the same time the completed blank shown in Fig. 5 is ejected from the punch 122. Therefore by the time the slide 6 has been nearly retracted to the position which was assumed at the start of the operating cycle, the cut-off slide 22 has moved forwardly to sever a fresh blank and bring it into register with the punch 90, while at the same time the transfer fingers 212 and 213 swing the blanks 97 and 111 into register with the dies 118 and 129 while the wire is being fed by the feed rolls through the slot 61 into engagement with the stop 30.

Therefore, everything is in readiness for the beginning of another operating cycle during which all the previously described operations will take place. As a result my machine is adapted to deliver a completely formed blank for each revolution of the main driving shaft as well as to simultaneously perform a number of different operations on different blanks so that there are at all times a number of blanks in different stages of completion in the machine. As a result, the machine is adapted to deliver completed blanks ready for the final thread rolling operation at a very high rate of production, as compared to those prior machines which are adapted to perform only one operation on a given blank at one time. While in the foregoing description certain mechanical movements have been described for performing certain desired results, obviously many of the results could be obtained by equivalent mechanical devices without departing from the underlying principles of operation of the machine, and I desire therefore, that only such limitations be imposed thereon as come within the scope of the appended claims.

I claim:

1. In a machine of the class described, a series of stationary dies arranged in a straight line, a corresponding series of punches arranged in a straight line on a reciprocatory head adapted to move all the punches in unison, means for presenting a blank to the first punch and die, and a series of transfer fingers mounted between adjacent dies each having an oscillatory movement from one die to another, with respect to a neutral non-blank engaging position between adjacent dies, out of the line of said punches.

2. In a machine of the class described, a series of stationary dies arranged in a straight line, a corresponding series of punches arranged in a straight line on a reciprocatory head adapted to move all the punches in unison, means for presenting a blank to the first punch and die, and a series of transfer fingers mounted between adjacent dies each having an oscillatory movement from a neutral non-blank engaging position between adjacent dies to engage a blank ejected from a die, one to transfer a blank from the first die to the second, another to transfer a blank from the second die to the third, and so on.

3. In a machine of the class described, means for feeding elongated stock, a series of stationary dies arranged in a straight line, a series of mating punches arranged in a straight line, means for reciprocating said punches, means for severing individual blanks from said stock, means for presenting said blanks successively to the first of said series of dies, ejecting means cooperating with said dies, and transfer fingers oscillating between adjacent dies for seizing each blank as it is ejected from a die, lifting it clear of the die and lowering it into register with the next adjacent die, as said punches move away from said dies.

4. In a machine of the class described, a series of stationary dies, a series of mating punches, means for reciprocating said punches, means for severing a blank of elongated stock and presenting it for insertion in the first die and transfer means comprising a transfer arm pivotally and slidably mounted and connected to a rotatable crank portion, whereby rotation of said crank imparts an oscillatory movement to said transfer arm to cause transfer fingers carried thereby to engage said blank as it is ejected from the first die and to carry it into register with the next adjacent die.

5. In a machine of the class described, a series of stationary dies, a series of mating punches, means for reciprocating said punches, means for severing a blank of elongated stock and presenting it for insertion in the first die and transfer means comprising a transfer arm pivotally and slidably mounted and connected to a rotatable crank portion, whereby rotation of said crank imparts an oscillatory movement to said transfer arm to cause transfer fingers carried thereby to swing from a neutral position between adjacent dies, engage a blank as it is ejected from one die, carry said blank over into alinement with the other die, and then return to its neutral position between and above the dies.

6. In a machine of the class described, a series of stationary dies, a series of mating punches, means for reciprocating said punches, means for severing a blank of elongated stock and presenting it for insertion in the first die and transfer means comprising a transfer arm pivotally and slidably mounted and connected to a rotatable crank portion, a pinion for rotating said crank portion, a reciprocatory member for operating said pinion, and separate cams having independent action for imparting movement in opposite directions to said reciprocatory member.

7. In a machine of the class described, a series of stationary dies, a series of mating punches, means for reciprocating said punches, means for severing a blank of elongated stock and presenting it for insertion in the first die and transfer means comprising a transfer arm pivotally and slidably mounted and connected to a rotatable crank portion, whereby rotation of said crank imparts an oscillatory movement to said transfer arm to cause fingers carried thereby to engage said blank as it is ejected from the first die, a reciprocatory member for operating said crank and independently acting cams for imparting movement in opposite directions to said reciprocatory member, said cams being angularly adjustable to variably control the arrival and departure of said transfer fingers with respect to the first die.

8. In a machine of the class described, a series of pairs of cooperating punches and dies arranged in a straight line, means for moving said punches in unison relatively to said dies, means for presenting a blank to the first punch and die, blank ejecting means cooperating with said dies, transfer fingers mounted between adjacent dies each having an oscillatory movement from one die to another, a reciprocatory member for operating said fingers, and a rotating shaft carrying independently acting cams for imparting movement in opposite directions to said reciprocatory member, said cams being angularly adjustable to variably control the arrival and departure of said transfer fingers with respect to the dies.

9. In a machine of the class described, the combination with a cooperating punch and die, means for moving said punch to force a blank into said die and a member movable longitudinally in said die for limiting the insertion of a blank therein by said punch, in one position, and for ejecting the blank from said die in another position, of a mechanism for imparting reciprocatory movement to said member in said die comprising an oscillatory lever carrying said member, a rotatable shaft having a pair of cams thereon and a connection between said cams and said lever whereby said member is controlled directly by said cams in both the blank limiting and blank ejecting position.

10. In a machine of the class described, the combination with a cooperating punch and die, means for moving said punch to force a blank into said die and a member movable longitudinally in said die for limiting the insertion of a blank therein by said punch, in one position, and for ejecting the blank from said die in another position, of a mechanism for imparting reciprocatory movement to said member in said die comprising an oscillatory lever carrying said member, a rotatable shaft having a pair of cams thereon and a connection between said cams and said lever whereby the entire movement of said member is controlled directly by said cams and the force of the blow of the punch against said blank is received by said member in its blank limiting position and transmitted to said lever and its connections.

11. In a machine of the class described, the combination with a cooperating punch and die, means for moving said punch to force a blank into said die and a member movable longitudinally in said die for limiting the insertion of a blank therein by said punch, in one position, and for ejecting the blank from said die in another position, of a mechanism for imparting reciprocatory movement to said member in said die comprising an oscillatory lever carrying said member, a rotatable shaft having a pair of cams thereon, a driving connection between said cams and said lever whereby the entire movement of said member is controlled directly by said cams, and means for adjusting said driving connection for varying the blank limiting position of said member in said die, independently of the blank ejecting position of said member.

12. In a machine of the class described, the combination with a cooperating punch and die, means for moving said punch to force a blank into said die and a member movable longitudinally in said die for limiting the insertion of a blank therein by said punch, in one position, and for ejecting the blank from said die in another position, of a mechanism for imparting reciprocatory movement to said member in said die comprising an oscillatory lever carrying said member, a connecting rod pivotally connected to one end of said lever, means for imparting a reciprocatory movement to said rod, means for pivotally supporting said lever intermediate its ends and a surface of revolution for supporting said lever at the end opposite to its point of attachment to said rod, whereby oscillatory movement of said lever by said rod results in that portion of the lever carrying the blank engaging member being moved in a substantially straight line.

13. In a machine for making bolts or the like wherein a length of material is advanced intermittently to cut off mechanism, which successively severs portions thereof to form blanks of predetermined lengths, which blanks are thereafter subjected to successive pressure operations, whereby to enlarge the cross sectional area of a portion thereof; a pair of dies; a pair of hammers adapted to co-operate with said dies respectively to perform successive operations upon the same blank, whereby the said sectional area is enlarged and reshaped at each of such operations; means, comprising in part, the means for cutting off the blanks from the length of material, for carrying a blank into position to be struck by the first hammer; means operating after each stroke of the first hammer for ejecting the blank from the first die; means for gripping and transferring the blank to the second die; and means operating after the stroke of the second hammer for ejecting the blank from the second die, said transfer means moving on its return travel during the engagement of the hammers with the blanks.

14. In a machine for making bolts or the like wherein a length of material is advanced intermittently to cut off mechanism, which successively severs portions thereof to form blanks of predetermined lengths, which blanks are thereafter subjected to successive pressure operations, whereby to enlarge the cross sectional area of a portion thereof; a pair of dies; a pair of hammers adapted to strike the blank in each of said dies simultaneously and thereby co-operate with said dies to perform successive operations upon the same blank, whereby the said sectional area is enlarged and reshaped at each of such operations; means, comprising in part, the means for cutting off the blanks from the length of material, for carrying a blank into position to be struck by the first hammer; means operating after each stroke of the first hammer for ejecting the blank from the first die; means for gripping and transferring said blank to the second die; and means operating after the stroke of the second hammer for ejecting the blank from the second die, said transfer means moving on its return travel during the engagement of the hammers with the blanks.

15. In a machine for making bolts or the like, wherein a length of material is advanced intermittently to cut off mechanism which successively severs portions thereof to form blanks of predetermined lengths, which blanks are thereafter subjected to successive pressure operations, whereby to enlarge the cross sectional area of a portion thereof; a series of pairs of co-operating punches and dies arranged in a substantially straight line; means for moving said punches in unison relatively to said dies; means, comprising in part the means for cutting off the blanks from the length of material, for presenting a blank to the first punch and die; blank ejecting means co-operating with said dies; and transfer fingers operating between adjacent dies to approach a blank as it is being ejected from a die with a movement adapted to spring the fingers over the blank, to carry said blank in register with the next adjacent die and to recede from said blank as it is projected into said die with a corresponding movement adapted to spring the fingers from the blank.

In testimony whereof, I have signed my name to this specification.

LOUIS S. BURBANK.